US008228537B2

(12) United States Patent
Uehara

(10) Patent No.: US 8,228,537 B2
(45) Date of Patent: Jul. 24, 2012

(54) PRINT MANAGING SERVER, PRINT MANAGING METHOD, PROGRAM, AND RECORDING MEDIUM

(75) Inventor: Toshiyuki Uehara, Matsudo (JP)

(73) Assignee: Canon Kabushiki Kaisha, Tokyo (JP)

( * ) Notice: Subject to any disclaimer, the term of this patent is extended or adjusted under 35 U.S.C. 154(b) by 249 days.

(21) Appl. No.: 12/144,466

(22) Filed: Jun. 23, 2008

(65) Prior Publication Data

US 2008/0259397 A1 Oct. 23, 2008

Related U.S. Application Data

(63) Continuation of application No. PCT/JP2007/075379, filed on Dec. 26, 2007.

(30) Foreign Application Priority Data

Dec. 28, 2006 (JP) ................................. 2006-355519

(51) Int. Cl.
*G06F 3/12* (2006.01)
(52) U.S. Cl. ........................ 358/1.15; 358/1.16; 718/100
(58) Field of Classification Search .................. 358/1.15
See application file for complete search history.

(56) References Cited

U.S. PATENT DOCUMENTS

| 2001/0013954 A1* | 8/2001 | Nagai et al. .................... 358/444 |
| 2001/0048833 A1* | 12/2001 | Katsuda et al. ................. 400/76 |
| 2003/0142348 A1 | 7/2003 | Hiramatsu et al. |
| 2003/0197887 A1* | 10/2003 | Shenoy et al. ............... 358/1.15 |
| 2005/0047843 A1* | 3/2005 | Kato ............................... 400/76 |
| 2005/0111013 A1 | 5/2005 | Maekawa |
| 2005/0275881 A1* | 12/2005 | Akashi et al. ................ 358/1.15 |
| 2006/0233563 A1* | 10/2006 | Matsuhara ....................... 399/80 |
| 2007/0146778 A1* | 6/2007 | Kitagata et al. .............. 358/1.15 |

FOREIGN PATENT DOCUMENTS

| JP | 11-119924 | 4/1999 |
| JP | 2003-208283 | 7/2003 |
| JP | 2005-156762 | 6/2005 |
| JP | 2006-099714 | 4/2006 |
| JP | 2006-295716 | 10/2006 |
| JP | 2006-341524 | 12/2006 |

OTHER PUBLICATIONS

International Preliminary Report on Patentability dated Sep. 17, 2009, issued in corresponding PCT Application No. PCT/JP2007/075379, and English language translation thereof.

* cited by examiner

*Primary Examiner* — Benny Q Tieu
*Assistant Examiner* — Marcellus Augustin
(74) *Attorney, Agent, or Firm* — Fitzpatrick, Cella, Harper & Scinto

(57) ABSTRACT

A print managing server is connected to a plurality of printers through a network and stores print data which can be printed by the printer in combination with user information. The print managing server has control means for controlling execution of a command including the user information which is received from the printer. The control means controls in such a manner that when the command is received, if a printing process corresponding to the user information included in the command is being executed for the other printer, the printing process which is being executed is stopped for the other printer and a process corresponding to the command is executed.

9 Claims, 7 Drawing Sheets

| PRINTER NAME | IP ADDRESS | PRESENCE/ABSENCE OF DISPLAY UNIT |
|---|---|---|
| PRINTER A | 10. 120. 10. 1 | PRESENCE OF DISPLAY UNIT |
| PRINTER B | 10. 120. 10. 2 | ABSENCE OF DISPLAY UNIT |
| PRINTER C | 10. 120. 10. 3 | PRESENCE OF DISPLAY UNIT |

FIG. 12

| DIRECTORY INFORMATION |
|---|
| 1st DATA PROCESSING PROGRAM<br>PROGRAM CODE GROUP CORRESPONDING TO STEPS IN FLOWCHART SHOWN IN FIG. 4 |
| 2nd DATA PROCESSING PROGRAM<br>PROGRAM CODE GROUP CORRESPONDING TO STEPS IN FLOWCHART SHOWN IN FIG. 7 |

PRINT MANAGING SERVER, PRINT MANAGING METHOD, PROGRAM, AND RECORDING MEDIUM

This application is a continuation of International Application No. PCT/JP2007/075379, filed on Dec. 26, 2007, which claims the benefit of Japanese Patent Application No. 2006-355519 filed on Dec. 28, 2006.

BACKGROUND OF THE INVENTION

1. Field of the Invention

The invention relates to control of a print managing server which is connected to a plurality of printers through a network and stores print data which can be printed by the printer in combination with user information.

2. Description of the Related Art

Hitherto, a print system of what is called "pull print (accumulation print)" in which only the authenticated user makes a print request to print data which has temporarily been accumulated onto a server from a printing apparatus, thereby enabling the print data to be output from the printing apparatus has been proposed. Thus, the print data corresponding to the authenticated user can be output from a desired printing apparatus.

For example, in Japanese Patent Application Laid-Open No. 2006-099714, there has been disclosed a print system in which an IC card authenticating process is executed by a multi-function apparatus, print data of the authenticated user is specified by a print managing server, and a print command is transmitted to a print server in which the specified print data has been stored, thereby enabling the print data of the authenticated user to be printed by a desired printing apparatus.

However, in the case of using the foregoing prior art by using authenticating means using, for example, contactless type IC card, once an authentication is made, a subsequent process (printing) is executed. Therefore, the IC card is not necessary until the process of a whole sheet responsive to a job to which an execution of the printing has been instructed is completed (or, the IC card is not necessary at all for the subsequent process), so that another printing can be executed by another printer although the printing is being executed (particularly, when a large quantity of printing is being executed, since it takes a long time until a sheet discharge is long, such a situation is liable to occur).

That is, in the related art, there is such a problem that since one user can simultaneously execute the printing by a plurality of printers, a state of a low security occurs.

SUMMARY OF THE INVENTION

There is disclosed a print managing server which is connected to a plurality of printers through a network and stores print data which can be printed by the printer in combination with user information, comprising: control means for controlling execution of a command including the user information which is received from the printer, wherein the control means controls in such a manner that when the command is received, if a printing process corresponding to the user information included in the command is being executed for the another printer, the printing process which is being executed is stopped for another printer and a process corresponding to the command is executed.

Further features of the present invention will become apparent from the following description of exemplary embodiments with reference to the attached drawings.

BRIEF DESCRIPTION OF THE DRAWINGS

FIG. 12 is a diagram for describing a memory map in a recording medium (storage medium) for storing various types of data processing programs which can be read out by each of apparatuses constructing the print system according to the invention.

DESCRIPTION OF THE EMBODIMENTS

First Embodiment

An embodiment of the invention will be described in detail hereinbelow with reference to the drawings.

Figure 1:
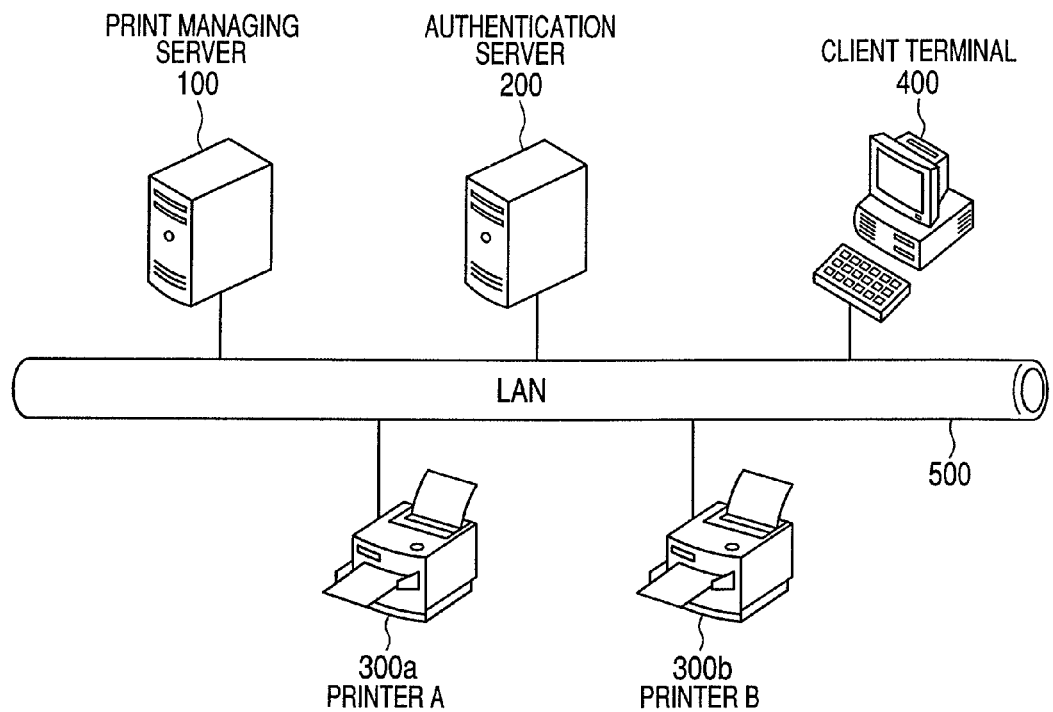
FIG. 1 is a system constructional diagram illustrating an example of a construction of a print system to which a print managing server of the invention can be applied.

FIG. 1 is a system constructional diagram illustrating an example of a construction of a print system to which a print managing server of the invention can be applied.

As illustrated in FIG. 1, the print system of the embodiment has such a construction that one or a plurality of client terminals 400 (for example, every user), a plurality of printers 300 (printer A 300a, printer B 300b, . . . ), a print managing server 100, and an authenticating server 200 are connected through a local area network (LAN) 500.

Form document producing software for obtaining form and text data necessary to produce a form document from a server (not shown), executing an overlay, and producing the form document has been installed in the client terminal 400. The form document producing software transmits the produced form document to the print managing server 100 together with a print execution command of the form document and user information by using communication such as SOAP or the like.

A printer driver has been installed in the print managing server 100, the received form document (print data) is accumulated, and the print data is transmitted to the printer 300 through the printer driver according to an output instruction from the printer 300.

The authenticating server 200 stores a table for authenticating an IC card (FIG. 8) and executes an authenticating process by using the IC card authenticating table according to an authenticating request from the printer 300 based on identification information (manufacturing number or the like of the IC card) read out of the IC card.

A hardware construction of an information processing apparatus which can be applied to the client terminal 400, print managing server 100, and authenticating server 200 illustrated in FIG. 1 will be described hereinbelow by using FIG. 2.

Figure 2:
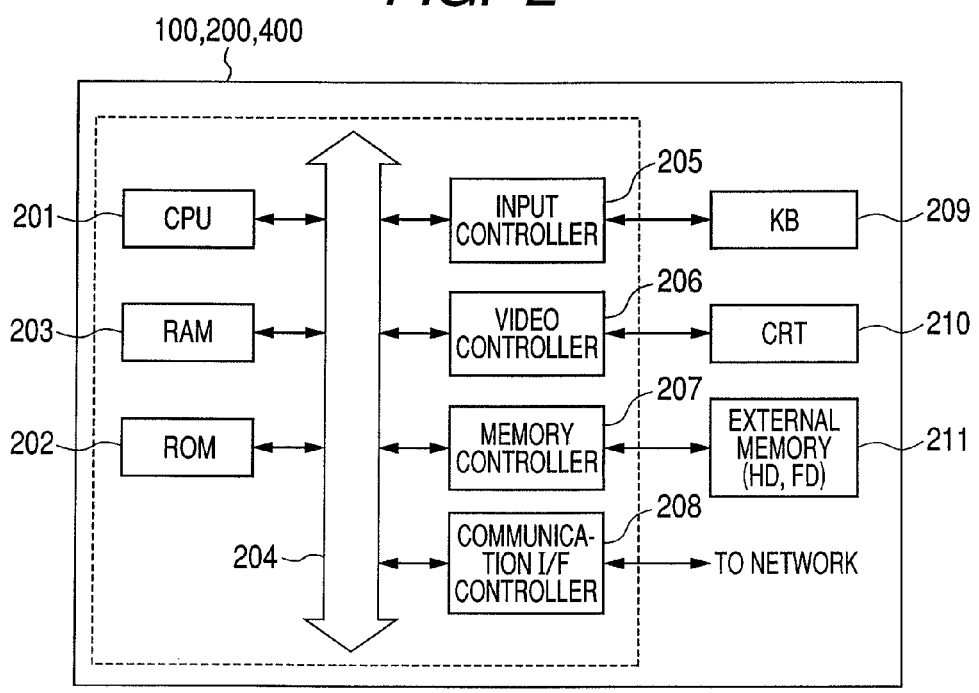
FIG. 2 is a block diagram illustrating a hardware construction of an information processing apparatus which can be applied to a print managing server 100, an authenticating server 200, and a client terminal 400 illustrated in FIG. 1.

FIG. 2 is a block diagram illustrating the hardware construction of the information processing apparatus which can be applied to the print managing server 100, authenticating server 200, and client terminal 400 illustrated in FIG. 1.

In FIG. 2, a CPU 201 unitarily controls devices and controllers connected to a system bus 204. A BIOS (Basic Input/Output System) as a control program and an operating system program (hereinbelow, OS) of the CPU 201, various types of programs, which will be described hereinafter, for realizing functions which are executed by each server or each PC, and the like have been stored in a ROM 202 or an external memory 211.

A RAM 203 functions as a main memory, a work area, or the like of the CPU 201. The CPU 201 loads programs and the like necessary for executing processes into the RAM 203 from the ROM 202 or the external memory 211 and executes the loaded programs, thereby realizing various kinds of operations.

An input controller 205 controls an input from a keyboard (KB) 209, a pointing device such as a mouse (not shown), or the like. A video controller 206 controls a display onto a display such as a CRT display (CRT) 210 or the like. Although the CRT 210 is illustrated in FIG. 2, the display is not limited only to the CRT but may be another display such as a liquid crystal display or the like. They are used by the administrator as necessary.

A memory controller 207 controls an access to an external memory 211 such as hard disk (HD), flexible disk (FD), compact flash (registered trademark) memory which is connected to a PCMCIA card slot through an adaptor, or the like in which a boot program, various types of applications, font data, a user file, an edition file, various kinds of data, and the like are stored.

A communication I/F controller 208 is connected to an external apparatus through a network (for example, LAN 500 illustrated in FIG. 1), communicates with the external apparatus, and executes a communication control process on the network. For example, communication using a TCP/IP or the like can be made.

The CPU 201 executes, for example, a developing (rasterizing) process of an outline font into an area for display information in the RAM 203, thereby enabling a display to be performed on the CRT 210. The CPU 201 enables the user to make an instruction by using a mouse cursor or the like (not shown) on the CRT 210.

Various types of programs, which will be described hereinafter, for realizing the invention have been recorded in the external memory 211. Those programs are loaded into the RAM 203 as necessary and executed by the CPU 201. Further, a definition file, various kinds of information tables, and the like which are used upon execution of the programs have also been stored in the external memory 211 and a detailed description about them will be also made hereinafter.

Subsequently, a hardware construction of a controller unit for controlling a printer 300 illustrated in FIG. 1 will be described by using FIG. 3.

Figure 3:
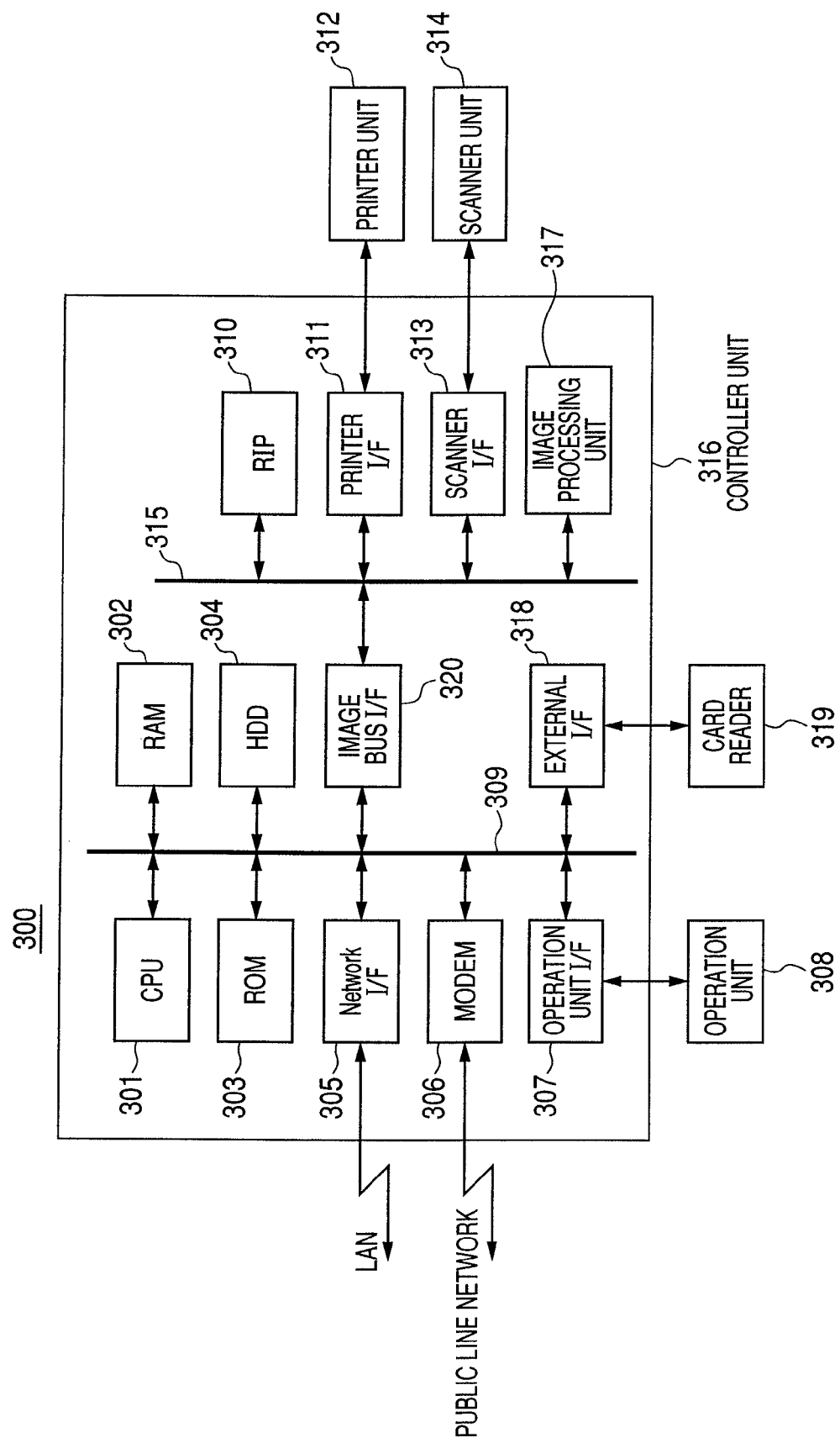
FIG. 3 is a block diagram illustrating an example of a hardware construction of a controller unit of a printer 300 illustrated in FIG. 1.

FIG. 3 is a block diagram illustrating an example of the hardware construction of the controller unit of the printer 300 illustrated in FIG. 1.

In FIG. 3, a controller unit 316 is connected to a scanner unit 314 functioning as an image input device and a printer unit 312 functioning as an image output device and is connected to a LAN (for example, LAN 500 illustrated in FIG. 1) and a public line (WAN) (for example, PSTN, ISDN, or the like), thereby inputting and outputting image data and device information.

In the controller unit 316, a CPU 301 is a processor for controlling the whole system. A RAM 302 is a system work memory for allowing the CPU 301 to operate. The RAM 302 is also a program memory for recording the program and an image memory for temporarily recording the image data.

The boot program of the system and various types of control programs have been stored in a ROM 303. A hard disk drive (HDD) 304 stores the various types of programs for controlling the system, the image data, and the like.

An operation unit interface (operation unit I/F) 307 is an interface unit with an operation unit (UI) 308 and outputs the image data which is displayed onto the operation unit 308 to the operation unit 308. The operation unit I/F 307 plays a role for transferring information (for example, user information and the like) input from the operation unit 308 by the user of the system to the CPU 301. The operation unit 308 has a display unit having a touch panel. The user depresses (touches with a finger or the like) a button displayed on the display unit and can make various kinds of instructions.

A network interface (Network I/F) 305 is connected to the network (LAN) and inputs and outputs data. A modem (MODEM) 306 is connected to the public line and executes input/output of the data such as transmission/reception or the like of FAX.

An external interface (external I/F) 318 is an I/F unit such as USB, IEEE1394, printer port, RS-232C, or the like for receiving an external input. In the embodiment, a card reader 319 for reading an IC card (storage medium) necessary in the authentication is connected to the external I/F unit 318. Through the external I/F 318, the CPU 301 controls the reading of information from the IC card by the card reader 319 and can obtain the information read out of the IC card. The foregoing devices are arranged on a system bus 309.

An image bus interface (IMAGE BUS I/F) 320 is a bus bridge for connecting the system bus 309 to an image bus 315 to transfer the image data at a high speed and converting a data structure.

The image bus 315 is constructed by a PCI bus or IEEE1394. The following devices are arranged on the image bus 315.

A raster image processor (RIP) 310 develops, for example, vector data such as a PDL code or the like into a bit map image. A printer interface (printer I/F) 311 connects the printer unit 312 to the controller unit 316 and executes a conversion of a synchronous system/asynchronous system of the image data. A scanner interface (scanner I/F) 313 connects the scanner unit 314 to the controller unit 316 and executes the conversion of the synchronous system/asynchronous system of the image data.

An image processing unit 317 executes a correction, a modification, or an edition to the input image data or executes a correction, a resolution conversion, or the like of the printer to the print output image data. In addition to them, the image processing unit 317 executes a rotation of the image data, executes a compressing/decompressing process of JPEG to multi-value image data, or executes a compressing/decompressing process such as JBIG, MMR, MH, or the like to binary image data.

The scanner unit 314 illuminates an image on paper as an original document and scans it by a CCD line sensor, thereby converting it into an electric signal as raster image data. The sheets for the original are set onto a tray of a document feeder. When the user of the apparatus instructs the reading and activation from the operation unit 308, the CPU 301 instructs the scanner unit 314, the feeder feeds the original sheets one by one, and the reading operation of the original image is executed.

The printer unit 312 is a portion for converting the raster image data into an image on the sheet. As a converting system, there is an electrophotographic system using a photosensitive drum and a photosensitive belt, an ink jet system for discharging ink from a micro-nozzle array and directly printing the image onto the sheet, or the like, and an arbitrary system may be used. The activation of the printing operation is started by an instruction from the CPU 301. The printer unit 312 has: a plurality of sheet feeding stages so that a different sheet size or a different sheet orientation can be selected; and sheet cassettes corresponding to the sheet feeding stages.

The operation unit 308 has an LCD display unit. A touch panel sheet has been adhered onto an LCD. An operation display screen of the system is displayed and when one of displayed keys is pressed, its position information is transferred to the CPU 301 through the operation unit I/F 307. The operation unit 308 has, for example, a start key, a stop key, an ID key, a reset key, and the like as various kinds of operation keys.

The start key in the operation unit 308 is used when the reading operation of the original image is started or the like. LEDs of two colors of green and red are provided in a center portion of the start key and whether or not the start key is in a usable state is shown by the color. The stop key in the operation unit 308 functions to stop the operation which is being executed. The ID key in the operation unit 308 is used when a user ID of the user is input. The reset key is used when settings from the operation unit are initialized.

The card reader 319 reads the information stored in an IC card (for example, FeliCa (registered trademark) of Sony Corporation) and notifies the CPU 301 of the read information through the external I/F 318 by control from the CPU 301.

By the construction as mentioned above, the printer 300 can transmit the image data read out of the scanner unit 314 onto the LAN 500 or allow the print data received from the LAN 500 to be printed and output by the printer unit 312.

The image data read out of the scanner unit 314 can be transmitted onto the public line via the FAX by the modem 306 or the image data received from the public line via the FAX can be output by the printer unit 312.

A process regarding the accumulation of the form document in the invention will be described hereinbelow with reference to a flowchart of FIG. 4.

Figure 4:
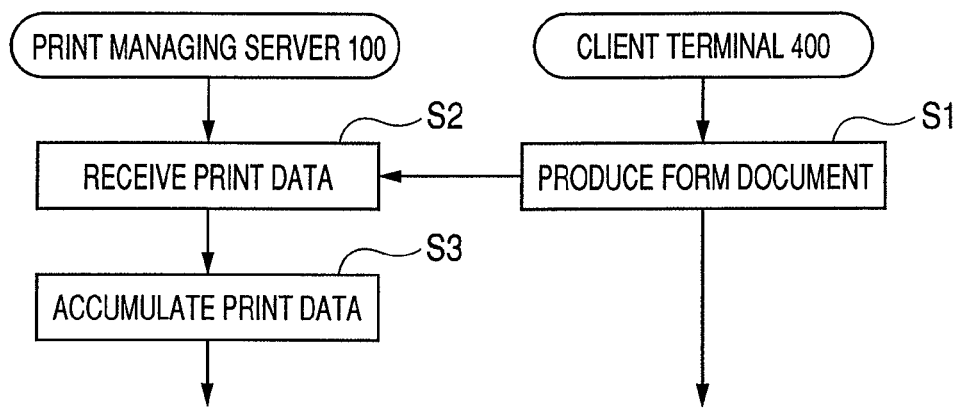
FIG. 4 is a flowchart illustrating an example of a first control processing procedure in the invention.

FIG. 4 is the flowchart illustrating an example of a first control processing procedure in the invention and corresponds to the process regarding the accumulation of the form documents in the invention.

In the flowchart, S1 corresponds to a step of the client terminal 400 and is realized by a method whereby a CPU of the client terminal 400 executes, on the RAM, a program stored in the external memory.

S2 and S3 correspond to steps of the print managing server 100 and are realized by a method whereby a CPU of the print managing server 100 executes, on the RAM, the program stored in the external memory.

First, in step S1, the CPU of the client terminal 400 obtains the text data and form data from the server (not shown), executes the overlay, and produces form document data. Further, the CPU of the client terminal 400 transmits the produced form document data to the print managing server 100. When the form document is transmitted, a user name (user information), a document name, and a processing instruction (print command here) are transmitted together with the form document data.

It is also possible to construct so that the form document data is transmitted from a plurality of client terminals 400.

In step S2, the CPU of the print managing server 100 executes a receiving process to the form document data transmitted from the client terminal 400.

Figure 5:
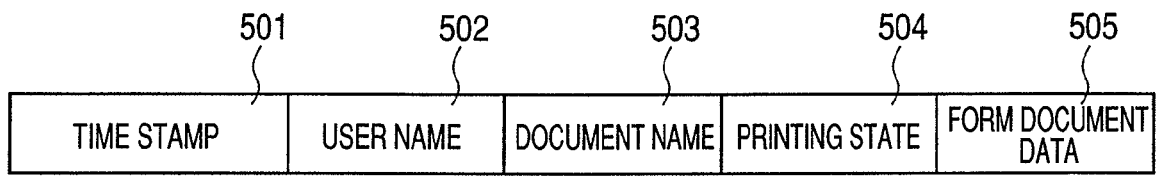
FIG. 5 is a schematic diagram illustrating an example of a form document management database (print management database) in the invention.

Subsequently, in step S3, the CPU of the print managing server 100 accumulates the form document data received in S1 into a form document management database (constructed in the HD of the print managing server 100) in a form as illustrated in FIG. 5.

The printer driver has been installed in the print managing server 100. A printer name, an IP address, and a printer driver name are stored and managed in the HD of the print managing server 100 in combination with each other as illustrated in a printer driver related table in FIG. 6.

FIG. 5 is a schematic diagram illustrating an example of the form document management database (print management database) in the invention.

As illustrated in FIG. 5, the form document management database (print management database) is constructed by a time stamp 501, a user name 502, a document name 503, a printing state 504, and form document data 505.

The time stamp 501 indicates a time/date when the print managing server 100 has received the form document data. The user name 502 and the document name 503 correspond to the user name (user information) and the document name received from the client terminal 400 together with the form document data.

Figure 6:
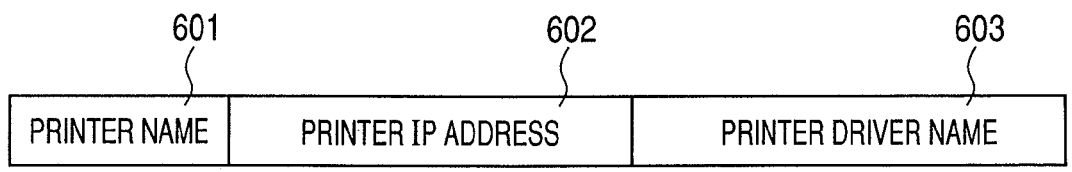
FIG. 6 is a schematic diagram illustrating an example of a printer driver related table in the invention.

FIG. 6 is a schematic diagram illustrating an example of the printer driver related table in the invention.

As illustrated in FIG. 6, the printer driver related table is constructed by a printer name 601, a printer IP address 602, and a printer driver name 603.

Processes regarding the printing based on a print instruction from the printer in the invention will be described hereinbelow with reference to a flowchart of FIG. 7.

Figure 7:
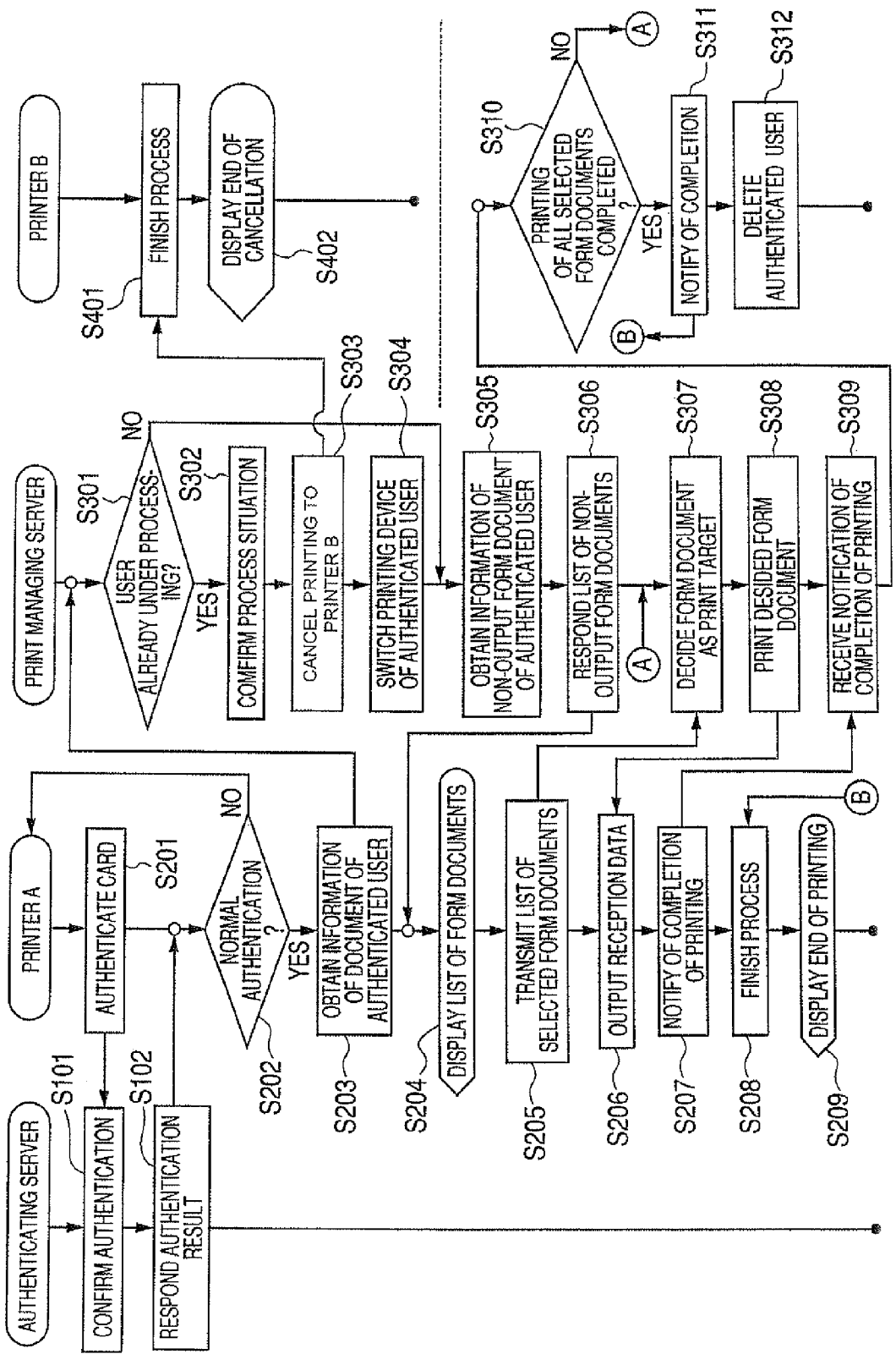
FIG. 7 is a flowchart illustrating an example of a second control processing procedure in the invention.

FIG. 7 is the flowchart illustrating an example of a second control processing procedure in the invention and corresponds to the processes regarding the printing based on the print instruction from the printer in the invention.

In the flowchart, S101 and S102 correspond to steps of the authenticating server 200 and are realized by a method whereby a CPU of the authenticating server 200 executes, on the RAM, the program stored in the external memory.

In the flowchart, S201 to S208 correspond to steps of the printer 300 (although a description will be made here on the assumption that it is the printer A 300a, it may be an arbitrary printer) and are realized by a method whereby the CPU 301 of the printer A 300a executes, on the RAM, the program stored in the ROM 303.

In the flowchart, S301 to S312 correspond to steps of the print managing server 100 and are realized by a method whereby the CPU of the print managing server 100 executes, on the RAM, the program stored in the external memory.

In the flowchart, S401 and S402 correspond to steps of the printer 300 (although a description will be made here on the assumption that it is the printer B 300*b*, it may be an arbitrary printer so long as it differs from the printer which executes S201 to S208) and are realized by a method whereby the CPU 301 of the printer B 300*b* executes the program stored in the ROM 303.

First, in step S201, when it is detected that the IC card has been put over the card reader 319, the CPU 301 of the printer A 300*a* reads out the detected card manufacturing number (identification information of the IC card) and transmits to the authenticating server 200 (card authentication).

Figure 8:
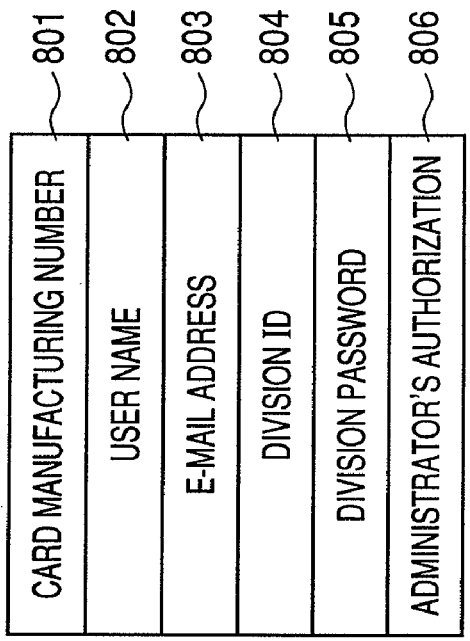
FIG. 8 is a schematic diagram illustrating an example of a table for authenticating an IC card in the invention.

In the authenticating server 200, when the identification information of the IC card transmitted from the printer A 300*a* is received, in step S101, the CPU of the authenticating server 200 authenticates whether or not the user is an authorized user with reference to the received ID number of the IC card and a table for authenticating the IC card (stored in the HD of the authenticating server 200) illustrated in FIG. 8.

FIG. 8 is a schematic diagram illustrating an example of the table for authenticating the IC card in the invention.

As illustrated in FIG. 8, the IC card authenticating table is constructed by a card manufacturing number 801, a user name 802, an E-mail address 803, a division ID 804, a division password 805, an administrator's authorization 806, and the like.

The description is returned to the description of the flowchart of FIG. 7 hereinbelow.

Subsequently, in step S102, the CPU of the authenticating server 200 transmits an authentication result of S101 to the printer (printer A 300*a*) which has requested the authentication. Specifically speaking, if the received card manufacturing number has been registered in the IC card authenticating table, it is determined that the user has been authenticated (normal authentication). The authentication result including the user name 802 in the IC card authenticating table is transmitted to the printer A 300*a*. If the received card manufacturing number is not registered in the IC card authenticating table, an authentication error is determined and the authentication result including information showing the authentication error is transmitted to the printer A 300*a*.

Subsequently, in the printer A 300*a*, when the authentication result transmitted from the authenticating server 200 is received, in step S202, based on the received authentication result, the CPU 301 of the printer A 300*a* discriminates whether or not the user has been authenticated as a regular user. If it is decided that the user is not authenticated as a regular user (no user information is included in the authentication result), the processing routine is returned to the initial state.

If it is decided in step S202 that the user has normally been authenticated (the user information is included in the authentication result), the CPU 301 of the printer A 300*a* advances the process to step S203.

Subsequently, in step S203, based on the user name included in the received authentication result, the CPU 301 of the printer A 300*a* requests the print managing server 100 to send a list of information of the image data which is not printed yet (list of form document information of the authenticated user) (send an information list transmission request command). The user name and the printer name (it may be an IP address) are also included in the information list transmission request command.

Subsequently, in the print managing server 100, when the information list transmission request command transmitted from the printer A 300*a* is received, in step S301, the CPU of the print managing server 100 discriminates whether or not the user name included in the received information list transmission request command indicates the user who is in a state where the printing process has already been being executed for another printer (the user name has been stored in a print management table stored in the HD of the print managing server 100 together with the printer name different from the above printer name).

Figure 9:
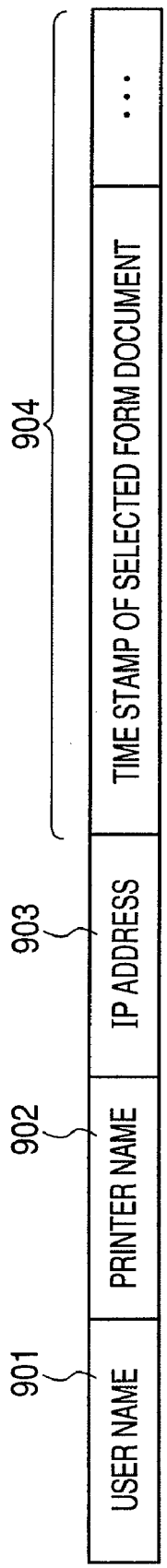
FIG. 9 is a schematic diagram illustrating an example of a print management table in the invention.

FIG. 9 is a schematic diagram illustrating an example of the print management table in the invention.

As illustrated in FIG. 9, the print management table is constructed by a user name 901, a printer name 902, an IP address 903, and time stamps 904 of the selected form documents (time stamps of the selected number exist).

In this print management table, when the print request command is received from the printer 300, information (the user name, the printer name, the IP address, the time stamps of the selected form documents (a plurality of time stamps are possible)) corresponding to the print request command is stored. After completion of the printing of all data corresponding to the print request command, the information corresponding to the print request is deleted.

The description is returned to the description of the flowchart of FIG. 7 hereinbelow.

If it is determined in step S301 that the user name included in the received information list transmission request command does not indicate the user who is in the state where the process has already been being executed (the user name and the printer name included in the received information list transmission request command are not stored in the print management table together with the printer name different from the printer name included in the received information list transmission request command), the CPU of the print managing server 100 advances the process to step S305.

In step S305, the CPU of the print managing server 100 obtains the non-print form document data corresponding to the user name included in the received information list transmission request command with reference to the form document management database illustrated in FIG. 5.

In step S306, the CPU of the print managing server 100 transmits a list of the form document data (form document data list) in the non-printing state corresponding to the user name included in the received information list transmission request command obtained in S305 to the printer 300 (printer A 300*a* here) which has issued the information list transmission request command. It is now assumed that the document name, user name, and time stamp (it may be an ID) of the form document are included as information which is transmitted as a form document data list mentioned above.

Subsequently, in the printer A 300*a*, when the form document data list transmitted from the print managing server 100 is received, in step S204, the CPU 301 of the printer A 300*a* displays the received form document data list onto the display unit of the operation unit 308.

Figures 10, 11:
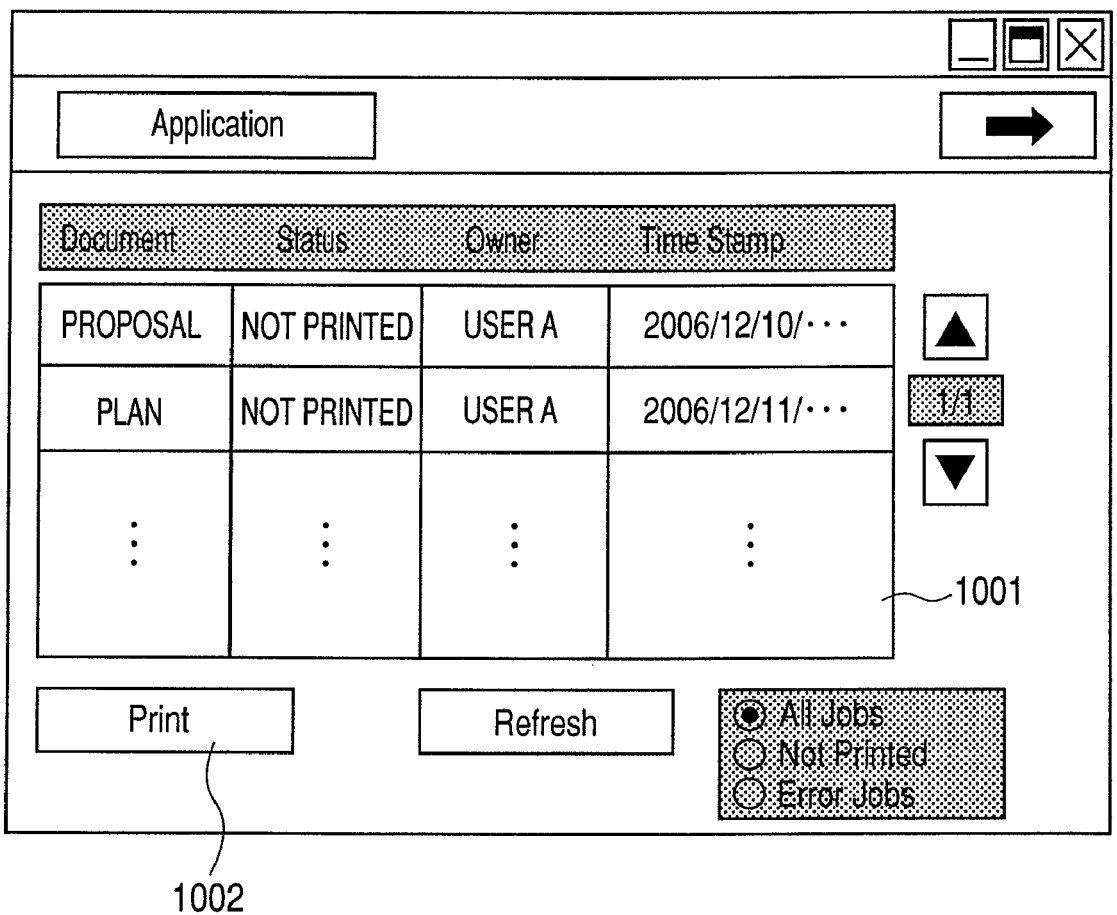
FIG. 10 is a schematic diagram illustrating an example of a list of form document data which is displayed to the printer 300 in the invention.
FIG. 11 is a schematic diagram illustrating an example of a table indicative of the presence or absence of a printer display unit in the invention.

FIG. 10 is a schematic diagram illustrating an example of the form document data list which is displayed to the printer 300 in the invention.

In FIG. 10, a form document data selecting area 1001 is shown. The user selects by touching the form document data to be printed from the form document data selecting area 1001 (a plurality of form document data can be selected).

By touch-instructing a print (Print) button 1002, the user can request the print managing server 100 to print the form document data which is in the selecting state in the form document data selecting area 1001.

The description is returned to the description of the flowchart of FIG. 7 hereinbelow.

When the form document data is selected in the form document data selecting area 1001 and the print button 1002 is touch-instructed, in step S205, the CPU 301 of the printer A 300a transmits the list of the form documents selected in the form document data selecting area 1001 (information (time stamps) of one or more of the selected form document data) as a print request command to the print managing server 100 together with the user name and the printer name (or IP address).

Subsequently, in the print managing server 100, when the print request command (user name, printer name (or IP address), information (time stamps) of one or a plurality of form documents) transmitted from the printer A 300a is received, in step S307, the CPU of the print managing server 100 obtains (decides) the form document data serving as a print target based on the information (time stamps) of one or a plurality of form documents included in the received print request command. When the print request command is received, the CPU of the print managing server 100 records the information (time stamps) of one or a plurality of form documents included in the received print request command into a print management table illustrated in FIG. 9 together with the user name, the printer name, and the IP address of the printer. Thus, which user prints which form document data by using which printer can be discriminated.

Subsequently, in step S308, the CPU of the print managing server 100 outputs (transmits) the form document data decided in S307 to the printer 300 (printer A 300a here) indicated by the corresponding printer name 902 and IP address 903 in the print management table. In this instance, the printer driver is selected by searching the printer driver related table (FIG. 6) based on the printer name 902 stored in the print management table. The print data of the form document data is output (transmitted) to the printer A through the selected printer driver.

Subsequently, in the printer A 300a, when the print data of the form document data which has been output from the print managing server 100 through the printer driver is received, the CPU 301 of the printer A 300a executes the print output based on the received print data of the form document data in step S206.

When the print output based on the print data of the form document data is completed, in step S207, the CPU 301 of the printer A 300a notifies the print managing server 100 of the print completion. It is assumed that the notification of the print completion is made by using the time stamp of the form document data corresponding to the print data whose printing has been completed. The timestamp is included in the print data (for example, header).

Subsequently, in the print managing server 100, when the notification of the print completion transmitted from the printer A 300a is received, in step S309, the CPU of the print managing server 100 sets the printing state in the form document database of the form document data corresponding to the completion-notified print data into "completion" based on the time stamp which is being processed at present, and deletes the time stamp of the corresponding form document from the print management table.

Subsequently, in step S310, the CPU of the print managing server 100 discriminates whether or not the printing of all form documents corresponding to the relevant user has been completed (whether or not all of the selected time stamps 904 of the corresponding user in the print management table have been deleted). If it is determined that the printing of all of the form documents is not completed yet, the process is returned to step S307.

If it is determined in step S310 that the printing of all of the form documents corresponding to the relevant user has been completed (all of the selected time stamps 904 of the corresponding user in the print management table have been deleted), the process advances to step S311.

In step S311, the CPU of the print managing server 100 notifies the printer (printer A 300a here) corresponding to the corresponding printer name 902 and IP address 903 in the print management table that the printing has been completed (print completion notification).

Subsequently, in the printer A 300a, when the print completion notification transmitted from the print managing server 100 is received, in step S208, the CPU 301 of the printer A 300a executes a post-process such as cancellation (logoff) of the authenticating state, release of the system, or the like.

Subsequently, in step S207, the CPU 301 of the printer A 300a displays a message indicative of the end of the printing onto the display unit of the operation unit 308 of the printer A 300a in order to notify the user that the printing of all of the selected form document data has been completed.

When the completion notification in S311 is finished, in step S312, the CPU of the print managing server 100 deletes the information (record) in the print management table corresponding to the user in which the printing of all of the selected form document data has been completed.

If it is decided in step S301 that the user name included in the received information list transmission request command indicates the user who is in the state where the process has already been being executed (the user name and the printer name included in the received information list transmission request command have been stored in the print management table together with the printer name different from the printer name included in the received information list transmission request command), the CPU of the print managing server 100 advances the process to step S302. The case where this process is executed corresponds to the case where, for example, the user authentication has already been made in the printer B 300b and the printing of the form document data corresponding to the user has been executed.

In step S302, since it has been decided that the user responsive to the information list transmission request command is in the state where the printing process has already been being executed by another printer, the CPU of the print managing server 100 decides the processing situation of the print managing server 100 to such another printer that the process has been finished at present point of time.

Subsequently, in step S303, the CPU of the print managing server 100 confirms about the presence or absence of the process which has already been being printed by another printer, and starts to prepare for shifting to the cancelling operation of the form document data of the sheet which has already been being discharged as printed matter which needs to be cancelled or the form document data which has been scheduled to be printed. In order to cancel the print reservation of the data whose printing has been reserved for such another printer and to stop a sheet discharging process to the printer with respect to the data of the sheet which is being discharged, the process is advanced to step S303.

In step S303, the CPU of the print managing server 100 cancel the printing for such another printer (it is assumed to be the printer B 300b here). In detail, if it is determined in step S302 that the printer is not under printing at present but is in a print reservation state, the CPU of the print managing server 100 does not execute anything to the printer B 300b. If it is determined that the printer is in a state where the print data of the sheet which is being discharged has been transmitted to the printer B 300b, a print cancelling instruction is transmitted to the printer B 300b in order to notify the printer B 300b of the interruption and end of the print data which is being transmitted at present. In this instance, the CPU of the print managing server 100 transmits a message showing that the printing process of the printer B 300b has been cancelled to the printer A 300a. Thus, the printer A 300a which is being used by the user at present can be informed that the printing by the printer B 300b which was authenticated before has been cancelled. Therefore, the user is enabled to recognize until which portion of the data it can be printed by the printer B 300b and from which portion of the data the printer A 300a is allowed to print. It is also possible to construct in such a manner that a list of form documents which could be printed by the printer B 300b is included in the above message, such a list is displayed in another window onto the display unit of the operation unit 308 of the printer A 300a, and the user is allowed to easily discriminate it.

It is also possible to construct in such a manner that when the IC card is inserted into the printer A 300a, a display screen to confirm a status of a job which is being processed in the printer B 300b is displayed onto the operation panel. The user confirms the status of the job which is being processed and subsequently makes a predetermined instruction on the operation panel of the printer A 300a. In response to the predetermined instruction, a command to control the printer B 300b is transmitted from the printer A 300a to the print managing server 100. When the printer B 300b receives the command from the print managing server 100, the printer B 300b cancels a portion which is not processed yet in the user's job which is being processed. Thus, in the printer A 300a, the user can also select about the cancellation after confirming the status of the job of the printer B 300b.

In the printer B 300b, when the print cancelling instruction transmitted from the print managing server 100 is received, in step S401, the CPU 301 of the printer B 300b interrupts the printing process after the sheet of the print data which is being printed by the printer B 300b was discharged.

Subsequently, in step S402, in order to notify the user that the printing of the printer B 300b has been interrupted (cancelled and finished), the CPU 301 of the printer B 300b displays a message showing that the printing has been cancelled onto the display unit of the operation unit 308 of the printer B 300b.

In the print managing server 100, by executing the processes of S302 and S303, all of the print data of the user which has newly requested is returned to the initial state.

Subsequently, in step S304, the CPU of the print managing server 100 changes the printer name 902 corresponding to the authenticated user name (user name included in the information list transmission request command) in the print management table to the printer name of the printer name (printer A 300a here) included in the information list transmission request command.

When the process of step S304 is finished, the CPU of the print managing server 100 advances the process to step S305 and obtains information of the non-print form document data corresponding to the authenticated user (user name included in the information list transmission request command). If the processes of steps S302 and S303 have been executed just before S305, the form document data which has already been printed is not handled as non-print form document data because its printing state is "completion".

It is also possible to construct in such a manner that if the form document was produced by the user and the print managing server received and accumulated the form document data while the user is authenticated in the printer A, the new form document data may be included in the list display.

As shown above, according to the embodiment, since the output of the same user is not performed from a plurality of printers, a security of the printer can be raised.

The embodiment has been described with respect to the construction of controlling in such a manner that when the print managing server 100 receives the information list transmission request command including the user information and the print request command including the user information from the printer 300 (for example, printer A 300a), if the printing process corresponding to the user information included in the command is being executed for such another printer (for example, printer B 300b), the printing process which is being executed is stopped for such another printer (printer B 300b) and the process corresponding to the command is executed. However, it is also possible to use a construction of similarly controlling in such a manner that even in the case of a command other than the information list transmission request command and the print request command, when the print managing server 100 receives an arbitrary command including the user information from the printer 300, if the printing process corresponding to the user information included in the command is being executed for such another printer (for example, printer B 300b), this printing process which is being executed is stopped and the process corresponding to the command is executed.

Since command including the user information which is transmitted from the printer 300 is a command which is issued after completion of the authenticating process in the printer 300, by processing it in a manner similar to the information list transmission request command and the print request command, the security of the printer can be raised.

Although the embodiment has been described with respect to the construction of executing the authenticating process based on the IC card manufacturing number stored in the IC card read out by the card reader equipped for the printer 300, an arbitrary authenticating method can be used. For example, either an authenticating method by a password or a biological authenticating method may be used.

As described above, by not processing the command of the same user received from a plurality of printers, the security of the printer can be raised.

The embodiment has been described with respect to the construction of controlling in such a manner that when the print managing server 100 receives the command including the user information from the printer 300 (for example, printer A 300a), if the printing process corresponding to the user information included in the command is being executed for another printer (for example, printer B 300b), this printing process which is being executed is stopped for another printer and the process corresponding to the command is executed.

However, it is also possible to construct in such a manner that when the print managing server 100 receives the command including the user information from the printer 300 (for example, printer A 300a), if the printing process corresponding to the user information included in the command is being executed for another printer (for example, printer B 300b), the command of the printer A 300a is refused and a message for urging an instruction to the user so as to return to the printer B from the printer A which is executing the printing process is displayed at the printer A.

Owing to such a construction as well, by not processing the command of the same user received from a plurality of printers, the security of the printer can be raised.

Second Embodiment

The above first embodiment has been described with respect to such a construction that in step S303 in FIG. 7, the CPU of the print managing server 100 cancels the print reservation of the form document data whose printing has been reserved for such another printer.

In the embodiment, while the time stamp of the form document data whose printing has been reserved is held as it is in the print management table in step S303 in FIG. 7, the CPU of the print managing server 100 controls so as to change the printer name 902 corresponding to the authenticated user name in the print management table to the printer name of the printer name (printer A 300a here) included in the information list transmission request command in step S304.

By using such a construction, for example, the form document data whose printing has been reserved in the printer B 300b is printed as it is by the printer (printer A 300a) which the user has newly authentication processed. Therefore, the user does not need to select again the form document data selected by the printer B 300b at the printer A 300a, and a troublesomeness of the selecting operation of the user can be reduced.

Third Embodiment

Although the first embodiment has been constructed in such a manner that the list of form documents to be printed (FIG. 10) is displayed onto the display unit of the operation unit 308 of the printer 300, in the third embodiment, processes which are executed when the printer 300 which cannot display the list of form document data (FIG. 10) has been connected to the network will be described.

When the printer 300 does not have the display unit (or, there is not a display unit enough to display the list), the CPU of the print managing server 100 does not transmit the list to the printer 300 but controls so as to obtain all of the corresponding form document data and execute the printing of all of the obtained form document data based on the information of the non-print form documents obtained in step S305.

In more detail, based on the user name and the printer name (IP address may be used) included in the information list transmission request command transmitted from the printer 300 in step S205 in FIG. 7, the CPU of the print managing server 100 controls so as to discriminate whether or not the printer 300 for executing the printing has the display unit for displaying the list of form document data in the non-printing state.

FIG. 11 is a schematic diagram illustrating an example of a table indicative of the presence or absence of the printer display unit in the invention. It is assumed that the printer display unit presence/absence table has previously been registered in the HD of the print managing server 100.

If it is determined that the printer 300 has the display unit enough to display the list, in step S306, the CPU of the print managing server 100 transmits a list of form document data in the non-printing state to the printer 300.

If it is determined that the printer 300 does not have the display unit enough to display the list, in step S307, the CPU of the print managing server 100 decides the form document data based on the user name and the printing state (not printed) after S305 and advances to step S308. In this case, if the authentication has normally been made, the user does not select the form document but all of the non-print form documents corresponding to the user are print-executed.

In place of the printer display unit presence/absence table illustrated in FIG. 11, it is also possible to construct in such a manner that the printer 300 side is allowed to discriminate the construction of the display unit equipped for the printer 300 and a request (command) which is transmitted to the print managing server 100 in step S203 is changed.

In this case, the CPU 301 of the print managing server 100 is constructed in such a manner that if the printer 300 does not have the display unit (the list cannot be displayed), a form document data batch transmitting request is transmitted to the print managing server 100, and if the printer 300 has the display unit (the list can be displayed), a list of form document data in the non-printing state is requested.

The print managing server 100 is constructed in such a manner that a type of received request is discriminated, if it is the list request, the list information is transmitted to the printer 300, and if it is the form document data batch transmitting request, the list information is not transmitted, the form document data is specified from the user name included in the received request, and this form document data is printed by the printer 300 corresponding to the received printer name.

Although the first and second embodiments have been constructed in such a manner that the form document data is provided for the print managing server 100 and the print data of the form document data is output from the print managing server 100 to the authenticated printer 300. However, it is possible to construct in such a manner that the one or a plurality of print servers are provided, the print data (PDL format) is held in the print server, and management information of the print data held in the print server is managed by the print managing server 100. It is also possible to construct in such a manner that the print managing server 100 instructs the print server in which the print data has been accumulated so that, based on the print instruction from the printer 300, the print server outputs the print data corresponding to the instruction to the instructed printer 300.

In the case of the above construction, the form document data is produced in the client terminal 400 and this form document data is transmitted as print data to the print server through the printer driver. It is now assumed that the print server holds the print data transmitted from the client terminal 400.

It is assumed that the print managing server 100 holds bibliography information (user name, IP address of the print data stored server, path of a storage destination of the print data, document name, time stamp, etc.) of the print data stored in the print server. By holding the bibliography information, the print managing server 100 can recognize in which print server, the print data designated by the printer 300 exists. The print instruction of the designated print data can be made from the print managing server to the print server which holds the print data.

Although the foregoing first to third embodiments have been described with respect to the construction in which the form document data is held in the print managing server 100, the invention can be also applied to such a construction that general print data is held in the print managing server 100.

The constructions and contents of the foregoing various kinds of data are not limited to those mentioned above but, naturally, they may be replaced by other various types of constructions and contents according to a use and an object.

Although one embodiment has been mentioned above, the invention can adopt an embodiment as, for example, a system, an apparatus, a method, a program, a recording medium, or the like. Specifically speaking, the invention can be applied to a system constructed by a plurality of apparatuses or may be applied to an apparatus constructed by one device.

A construction of data processing programs which can be read out by each of the apparatuses (print managing server 100, authenticating server 200, printer 300, and a client terminal 400) constructing the print system according to the invention will be described herein below with reference to a memory map illustrated in FIG. 12.

FIG. 12 is a diagram for describing the memory map in a recording medium (storage medium) for storing the various types of data processing programs which can be read out by each of the apparatuses (print managing server 100, authenticating server 200, printer 300, and a client terminal 400) constructing the print system according to the invention.

Although not shown in particular, information for managing the program group stored in the recording medium, for example, version information, implementors, and the like are also stored. There is also a case where information depending on the OS or the like of the program reading side, for example, icons for identifying and displaying the programs and the like are also stored.

Further, data depending on the various programs is also managed in the directory. If the program and data which are installed have been compressed, there is also a case where a program for decompressing them and the like are also stored.

The functions illustrated in FIGS. 4 and 7 of the embodiments may be executed by a host computer based on a program installed from the outside. In such a case, the invention is also applied to the case where an information group including the program is supplied to an output apparatus by a recording medium such as CD-ROM, flash memory, FD, or the like or from an external recording medium through the network.

Naturally, the object of the invention is also accomplished by a method whereby the recording medium in which program codes of software for realizing the functions of the embodiments mentioned above have been recorded is supplied to a system or an apparatus, and a computer (or CPU or MPU) of the system or the apparatus reads out and executes the program codes stored in the recording medium.

In this case, the program codes themselves read out of the recording medium construct the novel functions of the invention. The recording medium in which the program codes have been stored constructs the invention.

As a recording medium for supplying the program codes, for example, a flexible disk, a hard disk, an optical disc, a magnetooptic disc, a CD-ROM, a CD-R, a DVD-ROM, a magnetic tape, a non-volatile memory card, a ROM, an EEPROM, a silicon disk, or the like can be used.

Naturally, the invention incorporates not only the case where the computer executes the read-out program codes, so that the functions of the embodiments mentioned above are realized but also the case where the OS (Operating System) which is operating on the computer executes a part or all of actual processes based on instructions of the program codes, and the functions of the embodiments mentioned above are realized by those processes.

Naturally, the invention incorporates the case where the program codes read out of the recording medium are written into a memory equipped for a function expanding board inserted into the computer or a function expanding unit connected to the computer, thereafter, a CPU or the like equipped for the function expanding board or the function expanding unit executes a part or all of actual processes based on instructions of the program codes, and the functions of the embodiments mentioned above are realized by those processes.

The invention can be applied to a system constructed by a plurality of apparatuses or may be applied to an apparatus constructed by one device. Naturally, the invention can be applied to a case where the above functions are accomplished by supplying the program to the system or apparatus. In such a case, the recording medium in which the program expressed by the software for accomplishing the invention has been stored is read out to the system or the apparatus, so that the system or the apparatus can receive the advantages of the invention.

Further, the program expressed by the software for accomplishing the invention is downloaded and read out from a server, a database, or the like on the network by a communication program, so that the system or the apparatus can receive the advantages of the invention.

All constructions obtained by combining each of the foregoing embodiments and their modifications are also incorporated in the invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-355519, filed Dec. 28, 2006, which is hereby incorporated by reference herein in its entirety.

What is claimed is:

1. A print managing server which is connected to a plurality of printers through a network and stores print data for printing by the plurality of printers in combination with user information, comprising:
   a receiving unit configured to receive, after an authenticating process, a first command including first user information on a first user from a first printer of the plurality of printers;
   a determining unit configured to determine whether the first user has logged-in to a second printer of the plurality of printers;
   a control unit configured to control in such a manner that, if the determining unit determines that the first user has logged-in to the second printer,
   a second printing process, corresponding to the first user information included in the received first command, for execution for the second printer is canceled and a first printing process corresponding to the first user information included in the received first command is executed for the first printer so that a printing process based on print data which has been processed for the second printer is not executed again.

2. A print managing server according to claim 1, wherein the authenticating process is an authenticating process based on identification information stored in a storage medium read out by a storage medium reading unit provided for the first printer.

3. A print managing server according to claim 1, wherein the control unit allows a storing unit to store printer information of the second printer which is executing the second printing process and second user information included in a second command which has requested the second printing process in association with each other, and
   when the second printing process which is being executed is stopped for the second printer according to the reception of the first command including the first user information from the first printer, the control unit changes the second user information stored in the storing unit in association with the second printer to the first user information included in the first command received from the first printer.

4. A print managing server according to claim 1, wherein the first command including the first user information includes a command for requesting a list of the print data stored in combination with the first user information.

5. A print managing server according to claim 4, wherein the first command including the first user information includes a command for requesting the printing of the print data selected from the list of the print data obtained based on the command for requesting the list of the print data.

6. A print managing server according to claim 1, wherein the first command including the first user information includes a command for requesting the printing of all of the print data stored in combination with the first user information.

7. A print managing server according to claim 4, further comprising a holding unit configured to hold display unit construction information of each of the printers, and wherein when the command for requesting the list is received, based on the display unit construction information of the printers held in the holding unit, the control unit controls whether the list of the print data is transmitted or all of the print data stored in combination with the first user information included in the command is transmitted to the printer of a transmitting source of the first command.

8. A control method of a print managing server which is connected to a plurality of printers through a network and stores print data for printing by the plurality of printers in combination with user information, comprising:

- a receiving step of receiving, after an authenticating process, a first command including first user information on a first user from a first printer of the plurality of printers;
- a determining step of determining whether the first user has logged-in to a second printer of the plurality of printers;
- a command control step of controlling in such a manner that, if the determining step determines that the first user has logged-in to the second printer,
- a second printing process, corresponding to the first user information included in the received first command, for execution for the second printer is canceled and a first printing process corresponding to the first user information included in the received first command is executed for the first printer so that a printing process based on print data which has been processed for the second printer is not executed again.

9. A non-transitory computer-readable storage medium which stores a control program for causing a computer to execute a control method according to claim 8.

* * * * *